(12) United States Patent
Draxelmayr

(10) Patent No.: US 6,279,375 B1
(45) Date of Patent: Aug. 28, 2001

(54) METHOD OF SETTING SWITCHING POINTS FOR A SENSOR OUTPUT SIGNAL

(75) Inventor: Dieter Draxelmayr, Villach (AU)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/178,705

(22) Filed: Oct. 26, 1998

Related U.S. Application Data

(63) Continuation of application No. PCT/DE98/00511, filed on Feb. 20, 1998.

(30) Foreign Application Priority Data

Feb. 24, 1997 (DE) ............................. 197 07 263

(51) Int. Cl.$^7$ .............................. H01H 9/00; G01P 21/00; G01D 5/244
(52) U.S. Cl. .................... 73/1.88; 324/202; 327/72
(58) Field of Search .................... 73/1.88, 1.01, 73/1.37, 1.41; 324/202; 327/72

(56) References Cited

U.S. PATENT DOCUMENTS

| | | | |
|---|---|---|---|
| 3,852,658 | 12/1974 | Braun et al. | 323/16 |
| 4,318,617 | 3/1982 | Orsen | 356/373 |
| 4,521,727 | 6/1985 | Atherton et al. | 323/244 |
| 4,532,437 | 7/1985 | Bodig et al. | 324/166 X |
| 4,836,027 | 6/1989 | Hannappel et al. | 73/708 |
| 5,192,917 | 3/1993 | Schweigert et al. | 328/162 |
| 5,737,961 * | 4/1998 | Henisko et al. | 73/1.38 |
| 5,821,745 * | 10/1998 | Mokino et al. | 324/207.21 |

FOREIGN PATENT DOCUMENTS

| | | | |
|---|---|---|---|
| 2457520 | 1/1976 | (DE) . | |
| 3046797A1 | 9/1981 | (DE) . | |
| 3201811A1 | 9/1983 | (DE) . | |
| 3418906A1 | 11/1984 | (DE) . | |
| 3429854A1 | 3/1985 | (DE) . | |
| 3410292A1 | 9/1985 | (DE) | 377/24 |
| 3536020A1 | 4/1987 | (DE) . | |
| 3640242A1 | 5/1988 | (DE) . | |
| 3943386A1 | 7/1990 | (DE) | 73/1.88 |
| 4310384A1 | 10/1994 | (DE) | 330/84 |
| 4401949C1 | 3/1995 | (DE) . | |
| 4401525A1 | 7/1995 | (DE) . | |
| 19533779A1 * | 3/1996 | (DE) . | |
| 19600803A1 | 7/1996 | (DE) . | |
| 19504871A1 | 8/1996 | (DE) . | |
| 0489936A1 | 6/1992 | (EP) . | |
| 2013434A | 8/1979 | (GB) . | |
| 63-256860 * | 10/1988 | (JP) | 73/1.88 |

OTHER PUBLICATIONS

"Eine neue Generation von Hall–Effekt Zahnradsensoren: Vorteile durch die Verbindung von BIMos Technologie und neuen Verpackungskonzepten", DVI Berichte Nr. 1287, 1996, pp. 583–611.

* cited by examiner

*Primary Examiner*—Thomas P. Noland
(74) *Attorney, Agent, or Firm*—Herbert L. Lerner; Laurence A. Greenberg; Werner H. Stemer

(57) ABSTRACT

The sensor configuration has a sensor and a calibration circuit, which self-calibrates the system by setting its switching points. The calibration circuit is located in the output circuit of the sensor. The method utilizes the calibration circuit to set an offset in the output circuit using an offset D/A converter in such a way that the switching points coincide with reference values. The offset D/A converter is driven with a calibration logic unit.

2 Claims, 2 Drawing Sheets

METHOD OF SETTING SWITCHING POINTS FOR A SENSOR OUTPUT SIGNAL

CROSS-REFERENCE TO RELATED APPLICATION

This is a continuation of copending International Application PCT/DE98/00511, filed Feb. 20, 1998, which designated the United States, published as WO 98/37386 on Aug. 27, 1998.

BACKGROUND OF THE INVENTION

Field of the Invention

The present invention relates to a method of setting switching points in a system driven by a sensor configuration for any fixed ratio between the signal peaks in the output signal of a sensor.

The use of sensors to record the movement or the angular position of rotating parts is well known. Examples of this are crankshaft, camshaft, transmission, and ABS sensors in automobiles.

The sensors used in such cases are preferably Hall sensors, which sense the change in a magnetic field. For example, a permanent magnet is mounted on a part, which is in a fixed location, in order to produce a magnetic field. The magnetic field is then modulated by a gearwheel or other ferromagnetic pick-up, which is attached to the rotating part, according to position. In that configuration, the Hall sensor is preferably located between the permanent magnet and the gearwheel or pick-up, and is thus able to detect fluctuations in the magnetic field. If, for example, a tooth of the gearwheel is in the magnetic field, a "high" output signal is supplied, whereas a gap between the teeth produces a "low" output signal. In this way, the signal output by the Hall sensor can be used to infer the position or setting of a rotating part.

The signal supplied by a sensor is influenced considerably by the operating conditions under which the sensor is used. These operating conditions include unavoidable imponderablities, such as operating temperature or size of the air gap, etc. Despite the fluctuations caused by the operating conditions, the sensor should supply an output signal which is as well defined as possible. This means that the output signal should have a well defined waveform, irrespective of the fluctuations caused by the operating conditions. The reason for this is as follows:

If a sensor configuration supplies a sinusoidal signal, for example, then a well-defined response can be obtained from a system controlled by the sensor configuration if switching processes in the system, which depend on the output signal of the sensor, are carried out at the zero crossings of the signal. This is because these zero crossings are independent of the respective signal amplitude and, furthermore, have very steep edges.

Of course, in other signal waveforms of the output signal of the sensor, a switching point other than a zero crossing or the signal center may possibly also be advantageous.

Hence, when evaluating the output signal of a sensor for switching a system controlled by means of this sensor, a switching point should be maintained irrespective of the signal amplitude of the output signal of the sensor, and this applies even for very slow signals.

VDI Reports 1287, 1996, pages 583–611, "Eine neue Generation von 'Hall-Effect'-Zahnradsensoren: Vorteile durch die Ver-bindung von BIMos Technologie und neuen Verpackungsrezepten" [A new generation of Hall-effect gearwheel sensors: advantages as a result of the combination of BIMos technology and new packing formulations], describes a sensor configuration in which the amplitude of the output signal of a sensor is initially normalized, possibly using an analog/digital (A/D) converter. Two further A/D and D/A converters are then used to record the signal peak values. From these, a switching threshold is then derived and defined. Finally, in this manner, it is possible to obtain a system response which is essentially independent of temperature fluctuations and the width of the air gap. That sensor configuration requires a relatively large outlay, however, since gain matching and numerous A/D converters are necessary.

German published patent application DE 32 01 811 A1 describes a device for recording rotational speed, angle, position and the like. In that configuration, the signal from a sensor is passed to switching means which monitor the amplitude and/or amplitude fluctuations. To do this, the amplitude is recorded by a peak value meter and passed to a threshold stage. This marks a permissible range for fluctuations in the signal amplitude. If the range is not adhered to, the signal from the sensor is switched off, which ensures that no distorted signals are output. According to that method, the signal output by the sensor is not corrected, i.e. there is no retrospective action by the threshold stage on the output signal, in other words the output signal is monitored only passively.

SUMMARY OF THE INVENTION

It is accordingly an object of the invention to provide a method for setting the switching points of a sensor output signal, which overcomes the above-mentioned disadvantages of the heretofore-known devices and methods of this general type and whereby, with a small outlay, switching processes in a system driven by means of an output signal of a sensor are carried out reliably at selected points in the output signal of the sensor. In particular, the switching points should be maintained irrespective of the amplitude of the output signal.

With the foregoing and other objects in view there is provided, in accordance with the invention, a method of setting switching points in a system driven by a sensor configuration with a sensor generating an output signal having upper and lower signal peaks, which comprises the following steps:

determining switching points for a selectable ratio between an upper reference value and a lower reference value;

comparing the upper and lower reference values with upper and lower signal peaks in the output signal of the sensor;

fixing a ratio between the signal peaks of the output signal by readjusting an offset of the output signal whenever an asymmetrical signal position is detected;

simultaneously postadjusting the reference values to the upper and lower signal peaks equally quickly and in opposite directions whenever the upper and lower reference values are situated between the signal peaks or the signal peaks are situated between the upper and lower reference values; and continually repeating the comparing, fixing and postadjusting steps.

In accordance with a concomitant feature of the invention, the sensor output signal is a sinusoidal output signal and the switching points are set at the zero crossings of the output signal.

In order to carry out the method, an offset is set in the output circuit using an offset D/A converter, whilst a detector circuit comprising a current divider and a current mirror is used to record signal peaks in the output signal of the sensor, and resistors are used to set a previously determined switching point.

Subsequently, previously determined switching points remain constant irrespective of the amplitude of the output signal and hence, for example, irrespective of the width of the air gap.

Between the offset D/A converter and the detector circuit there is a calibration logic unit which is driven by comparators supplied, on the one hand, with the output signals of the current divider and the current mirror and, on the other hand, with the output signal of the sensor.

The switching points for a sinusoidal output signal are preferably set at the zero crossings of the output signal. This variant of the method has the advantage of very steep edges at the switching points.

The method according to the invention is extremely simple and precludes additional sources of error, such as are caused by additional switching means connected intermediately, for example a PGA.

Other features which are considered as characteristic for the invention are set forth in the appended claims.

Although the invention is illustrated and described herein as embodied in a method of setting switching points for a sensor output signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
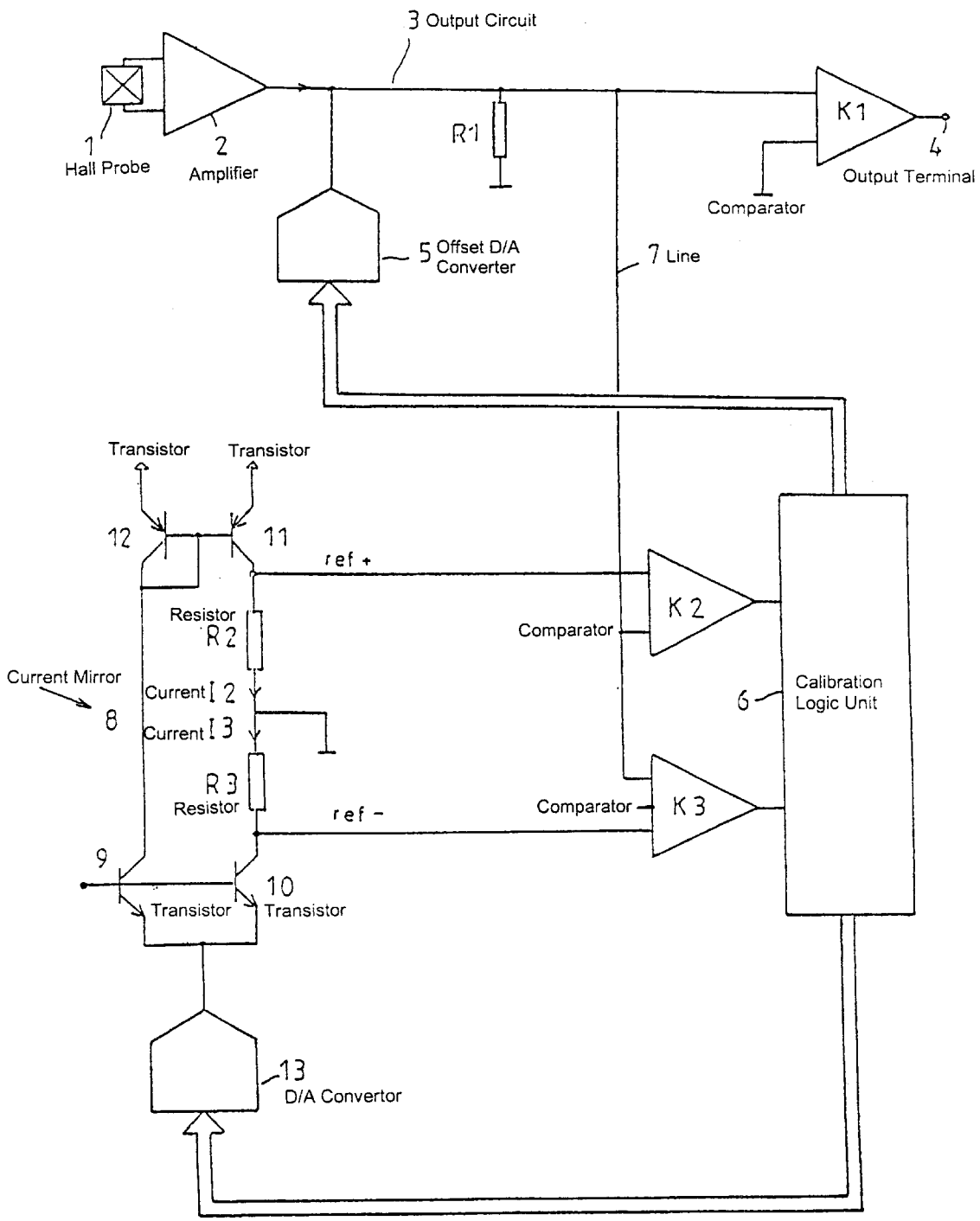
FIG. 1 is a schematic block diagram of the self-calibrating sensor configuration.

Referring now to the figures of the drawing in detail and first, particularly, to FIG. 1 thereof, there is seen a Hall probe 1 that supplies an output signal via an amplifier 2 to an output circuit 3 containing a resistor R1 which converts a current output as output signal into a voltage.

The circuit may, of course, also be designed differently, for instance where the output signal is a voltage output supplied to a voltage summing amplifier.

Finally, an output signal is supplied to an output terminal 4 via a first comparator K1. For purposes of noise suppression, the comparator K1 preferably exhibits hysteresis.

A calibration configuration comprising, in particular, an offset D/A converter 5 driven by a calibration logic unit 6 is used to set the offset or the displacement of the output signal of the amplifier 2 such that the predetermined switching point falls precisely at a reference voltage, for example ground. This predetermined switching point, that is to say, for example, the signal center, as explained in the introduction, is set by means of a voltage divider comprising resistors R2 and R3. This ensures that the switching point remains constant irrespective of the signal amplitude or the width of the air gap. The circuitry of the output circuit 3 is extremely simple, which means that additional sources of error, causing noise or signal distortions, for example, are precluded as far as possible.

The output signal of the Hall probe 1 and of the amplifier 2 is tapped off via a line 7 in the output circuit 3 and supplied to inputs of comparators K2 and K3, the other inputs of which receive voltages ref+ and ref− from a transistor auxiliary circuit comprising a current divider and a current mirror 8. The currents supplied to the resistors R2 and R3 are therefore equal. The ratio of the resistance values of the resistors R2 and R3 can then be used to set a reference-ground potential for any desired ratio between the voltages ref+ and ref−. This is because if the resistance values of the resistors R2 and R3 and the currents I2 and I3 flowing there in each case, for example, are of equal magnitude, the voltages ref+ and ref− are symmetrical about the reference-ground potential, which is ground in the present case. Hence, the switching point is then in the signal center.

If, for example, the following relationship is true for the resistance values of the resistors R2 and R3: R2=2×R3 and I2=I3, then the voltage ref+ is twice as far from the reference-ground potential as the voltage ref−. In this case, the switching point is then at ⅓ of the signal swing.

In addition, the current divider and the current mirror also have transistors 9, 10, 11, 12, the base of the transistor 9 receiving a bias voltage, and the emitters of the transistors 11 and 12 being connected to a voltage source.

The calibration logic unit 6 now operates as follows:

If the output signal of the amplifier 2 in the output circuit 3 provides neither the switching threshold of the comparator K2 nor the switching threshold of the comparator K3, a small signal is obviously present. In this case, the current is reduced by a peak value D/A converter 13 situated at the output of the calibration logic unit 6, said peak value D/A converter having a current output connected to the emitters of the transistors 9, 10. The current through the resistors R2 and R3 is therefore reduced. As a result, the voltages ref+ and ref− are approximated to the reference-ground potential equally quickly from opposite directions. The switching thresholds of the comparators K2 and K3 are therefore brought to the signal peaks in the output signal.

If, in contrast, both the switching threshold of the comparator K2 and the switching threshold of the comparator K3 are exceeded by the output signal in the output circuit 3, then the signal is large, which means that the current through the gain D/A converter 13 must be increased. Consequently, the increased current through the resistors R2 and R3 causes the voltages ref+ and ref− to change equally quickly and in opposite directions away from the reference-ground potential. Consequently, the switching thresholds of the comparators K2 and K3 are in turn brought to the signal peaks in the output signal, this time directed away from the reference-ground potential.

Finally, if only one of the two comparators K2 and K3 responds to the output signal in the output circuit 3, then the signal position is asymmetrical and the offset D/A converter 5 must be readjusted.

In the steady state of the sensor configuration, the position of the voltages ref+ and ref− is such that they reflect the signal peaks in the output signal of the amplifier 2 in the output circuit 3. In addition, the offset of the output signal is adjusted such that the distinguished switching point falls precisely at the reference-ground potential, for example ground.

Figure 2:
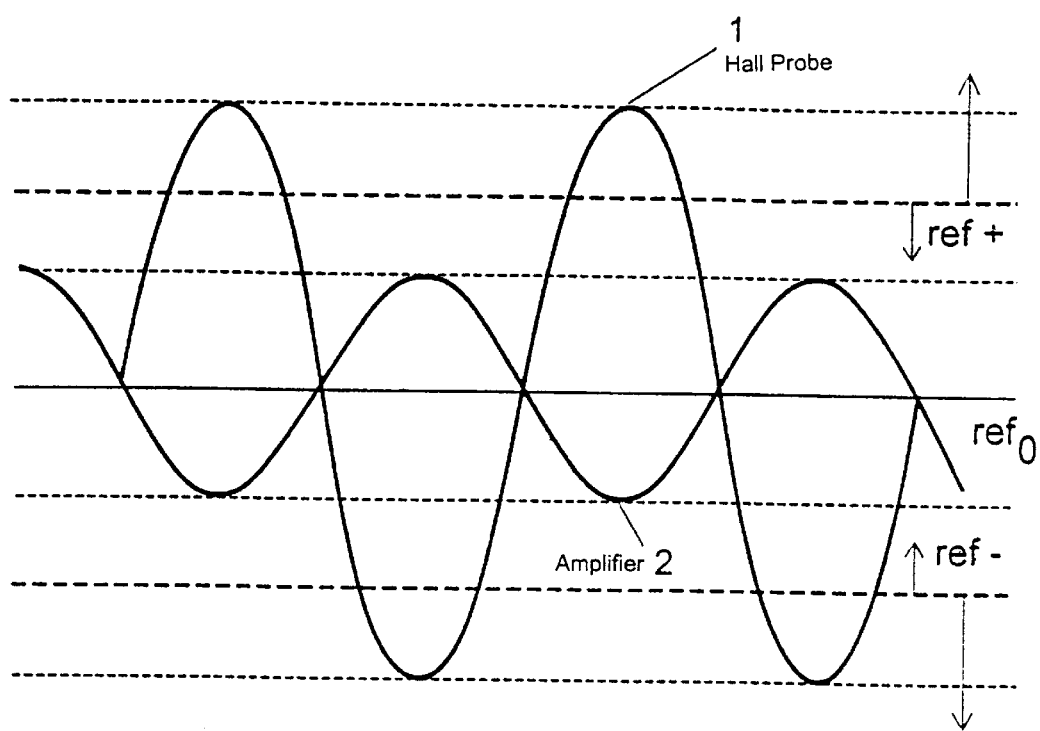
FIG. 2 is a graphical illustration of how the method according to the invention works.

FIG. 2 again illustrates how the method according to the invention works. The reference-ground potential $ref_0$ is set to be in between the two voltages ref+ and ref−. For a large output signal 1, the voltages ref+ and ref− are brought outward to the signal peaks, as indicated by the large arrows. For a small output signal 2, the voltages ref+ and ref− are brought inward to the signal peaks, as illustrated by the small arrows.

It should also be noted that any changes occurring in the gain matching, that is to say in the gain D/A converter 13, do not have any influence on the switching point, as this signal path is decoupled from the latter. This ensures that the output signal is highly reproducible, which is particularly important for crankshaft sensors.

The clock signal for the calibration logic unit 6 can be derived from the output signal in the output circuit 3. This is possible provided that the sensor configuration is generally calibrated, or at least the starting values of the sensor configuration produce regular, even if not precise, operation. If appropriate, an auxiliary clock signal may be supplied in a starting phase, said auxiliary clock signal shifting the offset from the offset D/A converter until a signal appears at the output circuit 3, the system then changing over to "normal" operation. This makes startup possible even with relatively ill-suited starting values.

If appropriate, the output circuit 3 may be additionally provided with a parallel path which defines the response in the uncalibrated state. In addition, it is also conceivable for calibration values which have been determined once to be stored in a permanent memory, such as an EEPROM or a fuse, and for these values then to be used for renewed startup of the sensor configuration when there is no calibration.

I claim:

1. A method of setting switching points in a system driven by a sensor configuration with a sensor generating an output signal having upper and lower signal peaks, which comprises the following steps:

determining switching points for a selectable ratio between an upper reference value and a lower reference value;

comparing the upper and lower reference values with upper and lower signal peaks in the output signal of the sensor;

fixing a ratio between the signal peaks of the output signal by readjusting an offset of the output signal whenever an asymmetrical signal position is detected;

simultaneously postadjusting the reference values to the upper and lower signal peaks equally quickly and in opposite directions whenever the upper and lower reference values are situated between the signal peaks or the signal peaks are situated between the upper and lower reference values; and continually repeating the comparing, fixing and postadjusting steps.

2. The method according to claim 1, wherein the sensor output signal is a sinusoidal output signal with zero crossings, and wherein the switching points are set at the zero crossings of the output signal.

* * * * *